Patented July 18, 1944

2,353,899

UNITED STATES PATENT OFFICE 2,353,899

ISOMERIZATION OF PARAFFIN HYDROCARBONS

Vladimir N. Ipatieff and Herman Pines, Chicago, Ill., assignors to Universal Oil Products Company, Chicago, Ill., a corporation of Delaware No Drawing. Application April 6, 1940,
Serial No. 328,321

9 Claims. (Cl. 260—683.5)

This application is a continuttion-in-part of our co-pending application Serial No. 238,066 filed October 31, 1938.

This invention relates particularly to the treatment of normally liquid normal paraffin hydrocarbons beginning with normal pentane to produce practical yields of iso-paraffin hydrocarbons therefrom, and is more specifically concerned with the use of particular catalysts and conditions of operation which are adapted to the furtherance of the desired reactions.

The present invention is directed to the treatment of normal paraffin hydrocarbons generally although obviously the particular conditions employed including the type of catalyst selected from the preferred group will vary considerably with the hydrocarbons of different molecular weight. The invention is directed to the treatment not only of the completely unbranched paraffin hydrocarbons but to those which may be of a partially branched character which can be further isomerized. The value of the process which is effective in increasing the degree of branching of paraffin hydrocarbons is thus obvious. The extensive tests on hydrocarbons as motor fuel both singly and in blends have indicated that their antiknock value is roughly proportional to the degree of branching in the molecule. The present process therefore finds distinct application to the reforming of highly paraffinic low antiknock value hydrocarbon motor fuel fractions to improve their antiknock properties with relatively low losses as compared with other thermal and catalytic reforming processes.

Normal pentane is a constituent of the lower boiling fractions of both straight run and cracked gasolines although it will obviously occur in higher percentages in those of the former variety. The conversion of normal pentane itself or fractions containing material percentages thereof into the iso-pentane has commercial value since iso-pentane has higher antiknock value and is more reactive in alkylation reactions wherein olefins are added to paraffin hydrocarbons in the presence of suitable catalysts to produce hydrocarbons of higher molecular weight. For example, isopentane may be alkylated with propylene to produce high yields of iso-octanes which are of value as constituents of premium gasolines such as those used in air-craft engines.

In one specific embodiment the present invention comprises a process for the isomerization of normally liquid normal paraffin hydrocarbons into substantial yields of their corresponding isomers, consisting in subjecting said hydrocarbons to contact with catalyst composites consisting of aluminum chloride mixed or fused with chlorides of alkali or alkaline earth metals, the molal proportion of the aluminum salt to the other salts being varied considerably although the weight per cent of aluminum chloride in the composites is preferably over 50.

It is a feature of the present invention that catalysts are utilized which promote principally isomerization reactions rather than decomposition reactions, these catalysts consisting essentially of double chlorides of aluminum and the other chlorides mentioned, which have a more moderate and selective action than aluminum chloride alone. These catalysts are prepared by fusing substantially anhydrous aluminum chloride and other chlorides such as calcium chloride under pressure at temperatures of the order of 300° C., the use of pressure being necessary to prevent volatilization of the aluminum chloride. The material produced is then granulated and may be used either in batch operations in which it is suspended in the hydrocarbon to be isomerized or as filler in reaction tubes or chambers through which the vapors of the hydrocarbon are passed. Best results are always obtained if a small amount of hydrogen chloride is present in the reaction zone, and undesirable decomposition reactions are substantially reduced by the use of hydrogen pressure in the reaction zone. As will be shown in later examples, materials of a fused character prepared by the method described show definitely better results in promoting the above isomerization reaction than mechanical mixtures of the two salts in the same proportions.

The optimum temperature for the isomerization reaction when operating under batch conditions is approximately 100° C. and the operations are conducted in vessels of suitable construction for withstanding pressures necessary to maintain a substantial proportion of the hydrocarbon in liquid phase. Stirring by rotation of the pressure vessel or by mechanical stirring devices is preferably done to insure good contact of the catalyst particles with the liquid and the time of a run will vary somewhat with the temperature used and the efficiency of the contact with the catalyst.

After the completion of a treatment, the bomb may be cooled and the gases released after which the hydrocarbon layer is removed and fractionated to recover the desired iso-hydrocarbons while the normal compounds are separately recovered and subjected to further isomerization treatment.

Vapor phase operations may be conducted by placing the granular catalytic material in reaction tubes and passing the vapors of hydrocarbons such as normal pentane at somewhat higher temperatures of the order of 150° C. over the granular material, the pressure being lower to permit vaporization of the hydrocarbon. The optimum temperature for the isomerization of a given normal or slightly branched chain paraffin hydrocarbon or mixtures of such hydrocarbons will obviously vary considerably and the determination of the optimum temperature is to some extent a matter of trial which may be conducted in small scale laboratory apparatus to determine the best yield of the desired isomeric products with minimum practical yields of byproducts. In such operations the products may be sent directly to fractionating systems to remove gaseous byproducts and separate iso and normal paraffin hydrocarbons, the last named being recycled to further contact with the catalyst so that high ultimate yields are made possible.

The following example is given to indicate the character of the results obtainable in the operation of the process without intending to limit the scope of the invention in exact correspondence with the data presented. Separate runs are shown to indicate the differences in results obtained when utilizing one of the preferred fused catalytic materials which had been fused prior to use and a simple mechanical mixture of two salts in the same proportions.

136 parts by weight of normal pentane were heated in a pressure vessel at 100° C. for four hours in the presence of 5.4 parts by weight of hydrogen chloride and 26.8 parts by weight of fused aluminum chloride-calcium chloride catalyst, the molal composition of the material being $2AlCl_3.CaCl_2$. The following tabulation shows the yields of products in parts by weight:

| | Per cent |
|---|---|
| Iso-butane | 8.3 |
| Iso-pentane | 37.1 |
| Normal pentane | 54.6 |

A repetition of the above described experiment using a mechanical mixture of anhydrous aluminum and calcium chlorides in the same proportions gave the following yields of products:

| | Per cent |
|---|---|
| Iso-butane | 54.7 |
| Normal butane | 10.9 |
| Iso-pentane | 19.6 |
| Normal pentane | 6.2 |
| Heavier hydrocarbons | 8.6 |

It will be seen from the above comparative tests that much more definite results were obtained with the fused catalyst than with corresponding amounts of the mechanically mixed materials since in the first instance there was no formation of materials heavier than normal pentane, and the yield of iso-pentane was 37.1% compared with 19.6% in the case of the mixed catalyst.

We claim as our invention:

1. A process for the isomerization of normal pentane into iso-pentane which comprises subjecting said normal pentane under isomerizing conditions to contact with catalytic material consisting essentially of a fused mixture of aluminum chloride and calcium chloride in the molal ratio of aluminum chloride to calcium chloride greater than 1 and a minor amount of hydogen chloride.

2. A process for the isomerization of normal pentane into iso-pentane which comprises subjecting said normal pentane in the liquid phase under superatmospheric pressure and at a temperature of the order of 100–150° C. to contact with catalytic material consisting of essentially a fused mixture of aluminum chloride and calcium chloride in the molal ratio of aluminum chloride to calcium chloride greater than 1 and a minor amount of hydrogen chloride.

3. A process for the isomerization of normal pentane into iso-pentane which comprises vaporizing said normal pentane and subjecting the vapors at a temperature of the order of 125–175° C. to contact with granular catalytic material prepared from a fused mixture of aluminum chloride and calcium chloride in the molal ratio of aluminum chloride to calcium chloride greater than 1 and a minor amount of hydrogen chloride.

4. A process for the isomerization of normal pentane into iso-pentane which comprises subjecting said normal pentane in the liquid phase under superatmospheric pressure and at a temperature of the order of 100–150° C. to contact with catalytic material consisting essentially of a fused mixture of aluminum chloride and calcium chloride in the molal ratio of aluminum chloride to calcium chloride greater than 1 and a minor amount o fhydrogen chloride, fractionating the products to separate iso and normal pentane, and returning the normal pentane to further isomerizing treatment.

5. A continuous process for the isomerization of normal pentane into iso-pentane which comprises vaporizing said normal pentane and subjecting the vapors at a temperature of the order of 125–175° C., to contact with granular catalytic material prepared from a fused mixture of aluminum chloride and calcium chloride in the molal ratio of aluminum chloride to calcium chloride greater than 1 and a minor amount of hydrogen chloride, fractionating the products to separate iso and normal pentane, and returning the normal pentane to further isomerizing treatment.

6. A process for converting normal pentane into iso-pentane which comprises contacting the normal pentane under isomerizing conditions with a double chloride of aluminum and calcium.

7. A process for converting normal pentane into iso-pentane which comprises contacting the normal pentane under isomerizing conditions with a fused mixture of aluminum chloride and calcium chloride in the molal ratio of aluminum chloride to calcium chloride greater than 1 to 1.

8. A process for converitng normal and branched-chain paraffins into branched and more highly branched-chain paraffins which comprises contacting the paraffin in the presence of added hydrogen chloride and under isomerizing conditions with a double chloride of aluminum and calcium.

9. A process for converting normal and branched-chain paraffins into branched and more highly branched-chain paraffins which comprises contacting the paraffin in the presence of added hydrogen chloride and under isomerizing conditions with a fused mixture of aluminum chloride and calcium chloride, the molal ratio of the aluminum chloride to the calcium chloride being greater than one.

VLADIMIR N. IPATIEFF.
HERMAN PINES.